(12) United States Patent
Piesker

(10) Patent No.: US 8,844,863 B2
(45) Date of Patent: Sep. 30, 2014

(54) DEVICE FOR MECHANICALLY DECOUPLED FASTENING OF AN AIRCRAFT COMPONENT PERFUSED BY HOT GAS

(75) Inventor: Markus Piesker, Lueneburg (DE)

(73) Assignee: Airbus Operations GmbH, Hamburg (DE)

( * ) Notice: Subject to any disclaimer, the term of this patent is extended or adjusted under 35 U.S.C. 154(b) by 495 days.

(21) Appl. No.: 12/809,910

(22) PCT Filed: Nov. 10, 2008

(86) PCT No.: PCT/EP2008/009462
§ 371 (c)(1),
(2), (4) Date: Jun. 21, 2010

(87) PCT Pub. No.: WO2009/083066
PCT Pub. Date: Jul. 9, 2009

(65) Prior Publication Data
US 2010/0269328 A1 Oct. 28, 2010

Related U.S. Application Data

(60) Provisional application No. 61/015,870, filed on Dec. 21, 2007.

(30) Foreign Application Priority Data

Dec. 21, 2007 (DE) .......................... 10 2007 061 995

(51) Int. Cl.
*A01K 1/10* (2006.01)
*F02C 7/06* (2006.01)
(Continued)

(52) U.S. Cl.
CPC . *B64D 41/00* (2013.01); *F02K 1/04* (2013.01); *F16L 27/111* (2013.01); *F02K 1/80* (2013.01); *B64D 2033/045* (2013.01);
(Continued)

(58) Field of Classification Search
CPC ........ B21C 37/20; B29C 70/30; B64C 1/166; B64D 33/00; B64D 41/00; B64D 2033/045; B64D 2041/002; B64F 5/009; F16L 27/00–27/11; B21D 15/00–15/10; B01F 5/0471; B01F 5/049; B01F 5/0413; Y02T 50/44
USPC .............. 29/700; 60/322, 323, 785, 225, 269, 60/39.08; 285/33, 39, 49, 187, 226, 229; 244/131, 58; 248/557, 613, 638
See application file for complete search history.

(56) References Cited

U.S. PATENT DOCUMENTS 4,106,798 A * 8/1978 Haug ............................ 285/226
4,121,860 A * 10/1978 Hoffman ....................... 285/226
(Continued)

FOREIGN PATENT DOCUMENTS

DE  690 19 360 T2  2/1996
DE  20 2004 019988 U1  3/2005
(Continued)

OTHER PUBLICATIONS

International Search Report, PCT/EP2008/009462, Feb. 25, 2009, Airbus Deutschland GmbH.

*Primary Examiner* — Minh Trinh
(74) *Attorney, Agent, or Firm* — Krieg DeVault LLP

(57) ABSTRACT

Device for mechanically decoupled retention of components perfused by hot gas in an aircraft, with a coupling member for coupling to a component emitting hot gas and to a component accepting hot gas, with a holder, with a flange, and with a bellows, the holder being fittable to a housing or frame connected to the component emitting hot gas, the bellows being fastened by one end to the flange and by the other end to the holder, and the coupling member being fastened to the flange. By virtue of the device, both an angular misalignment and radial and axial positional misalignment can be equalized.

20 Claims, 3 Drawing Sheets

(51) Int. Cl.
  *F01N 7/10* (2006.01)
  *F02K 1/04* (2006.01)
  *F16L 27/111* (2006.01)
  *F02K 1/80* (2006.01)
  *B64D 41/00* (2006.01)
  *F16L 59/21* (2006.01)
  *F01D 25/30* (2006.01)
  *F01N 13/18* (2010.01)
  *B64D 33/04* (2006.01)

(52) U.S. Cl.
  CPC ............... Y02T 50/671 (2013.01); *F16L 59/21* (2013.01); *F05D 2220/50* (2013.01); *F01D 25/30* (2013.01); *B64D 2041/002* (2013.01); *F01N 13/1816* (2013.01)
  USPC ................... 244/58; 60/322; 60/323; 60/785; 244/131; 29/700

(56) References Cited

U.S. PATENT DOCUMENTS

| | | | | |
|---|---|---|---|---|
| 4,659,117 A * | 4/1987 | Holzhausen et al. | ........... | 285/49 |
| 5,145,215 A * | 9/1992 | Udell | ............... | 285/49 |
| 5,159,811 A * | 11/1992 | Hefler et al. | .................... | 60/322 |
| 5,238,365 A * | 8/1993 | Petsche | ........................ | 415/178 |
| 5,689,954 A * | 11/1997 | Blocker et al. | .................. | 60/322 |
| 5,937,653 A * | 8/1999 | Alary et al. | ...................... | 60/748 |
| 5,971,439 A * | 10/1999 | Cwik | ............... | 285/49 |
| 6,032,463 A * | 3/2000 | Bock | ............... | 60/323 |
| 6,151,893 A * | 11/2000 | Watanabe et al. | ............... | 60/322 |
| 6,293,098 B1 * | 9/2001 | Coates | ............... | 60/322 |
| 6,464,257 B1 * | 10/2002 | Cwik et al. | ...................... | 285/49 |
| 7,040,576 B2 * | 5/2006 | Noiseux et al. | ............. | 244/129.2 |
| 7,992,821 B2 * | 8/2011 | Piesker | ........................ | 244/131 |
| 8,042,840 B2 * | 10/2011 | Chahine et al. | ............... | 285/226 |
| 2003/0021675 A1 * | 1/2003 | Tiemann | ........................ | 415/134 |
| 2003/0110778 A1 * | 6/2003 | Karafillis et al. | ............... | 60/785 |
| 2004/0100096 A1 | 5/2004 | Atansoski et al. | | |
| 2005/0232769 A1 * | 10/2005 | Lee et al. | ...................... | 416/97 R |
| 2009/0255591 A1 * | 10/2009 | Grout et al. | ...................... | 137/334 |

FOREIGN PATENT DOCUMENTS

| | | |
|---|---|---|
| EP | 0 987 409 | 3/2000 |
| WO | WO 2006/034461 | 3/2006 |

* cited by examiner

DEVICE FOR MECHANICALLY DECOUPLED FASTENING OF AN AIRCRAFT COMPONENT PERFUSED BY HOT GAS

CROSS REFERENCE TO RELATED APPLICATIONS

The present application is a §371 national stage patent application of PCT/EP2008/009462, filed Nov. 10, 2008, which claims priority from German Patent Application No. 10 2007 061 995.4, filed Dec. 21, 2007 and claims the benefit of U.S. Provisional Patent Application No. 61/015,870, filed Dec. 21, 2007, each of which is incorporated herein by reference.

FIELD OF THE APPLICATION

The invention relates to a device for mechanically decoupled fastening of an aircraft component perfused by hot gas to a housing or frame.

BACKGROUND

Hot gas in an aircraft arises, for example, in the course of operation of an auxiliary aggregate (in the following also called "Auxiliary Power Unit" or APU, respectively) which generates hot gas in the form of waste gas having a temperature of up to 730° C. A waste-gas system that cools and conducts away waste gas has to be mechanically connected to the structure of the aircraft and simultaneously be capable of equalising relative movements due to operation, thermal expansions, tolerances of manufacture and assembly.

In the case where use is made of ducts or channels for transporting gases, relative movements or production tolerances are ordinarily preferably compensated through the use of elastic rubber elements. By reason of the high temperatures arising in the case of pipes perfused by hot gas, the use of temperature-sensitive rubber—such as, for example, a rubber bellows—alone is no longer possible.

Furthermore, bellows made of metal are employed in addition which, although temperature-resistant, require certain minimal dimensions in order to be able to equalise predetermined relative movements. The minimal dimensions conflict with a requisite compact and effective structure in an aircraft, so that bellows made of metal are disadvantageous for the desired field of application.

In an aircraft, for instance, when conducting away APU waste gases, devices for positional equalisation are frequently used that can be compared with a piston/piston-ring combination. In the case of an APU arranged in the tail of an aircraft, such a technical solution is adequate for compensating the static and dynamic dimensional deviations between the APU, by way of system generating hot gas, and the waste-gas system. In this connection the APU and the waste-gas system are fastened to the same structural section. In the case where the APU and the waste-gas system are not fastened to the same structural section, both dynamic and static dimensional deviations that arise between the structural sections involved have to be taken into account. For instance, in the case of the military transporter of the AIRBUS A400M type the waste-gas system is fastened to the wing/fuselage fairing, and both the APU and an associated firewall are fastened to the fuselage. The dimensional deviations of the various structural sections therefore have to be taken into account in addition to the dimensional deviations between the system generating hot gas and the waste-gas system. Compensating the additive dimensional deviations between the APU and the waste-gas system and also, in addition, the dimensional deviations between the two structural sections by means of the proven piston/piston-ring combination could only be realised with an appropriately high piston-ring height. Associated with this, a correspondingly distinct increase in the restoring forces of the piston ring in the installed state would occur, resulting in increased friction. By virtue of the larger relative movements, in addition the forces due to the mass accelerations would increase. By reason of the thermal loading by the hot gas the structural members for conducting hot gas would be unable to support the high friction forces, as a result of which damage may arise.

DE 690 19 36012 relates to a flexible coupling device for a waste-gas or exhaust pipe manifold system of an internal-combustion engine, which serves to connect a first manifold section to a second manifold section. Formed on the first manifold section is a flange extending radially outwards, to which a first end of a flexible bellows is fastened by means of a first retaining ring. At its end facing towards the first manifold section the second manifold section likewise exhibits a flange projecting radially outwards, which forms a flat fastening surface. A second retaining ring is connected to the flange formed on the second manifold section and further secures a guide ring as well as a second end of the flexible bellows.

DE 20 2004 019 988 U1 discloses a connecting element for non-rigid connection of the end regions of two pipelines, which comprises a heat-protection element consisting of a mounting-pipe part and a protecting-pipe part for protection of a bellows element from hot gases flowing through the pipelines. Between end regions of the mounting-pipe part and the protecting-pipe part a flexible-spring arrangement may be provided.

SUMMARY

The object underlying the invention is to propose a device for mechanically decoupled fastening of an aircraft component perfused by hot gas to a housing or frame, which is of compact construction and, in addition, capable of compensating static and dynamic dimensional deviations, and also of withstanding the thermal loads placed upon them.

The object is achieved by a device for mechanically decoupled fastening of an aircraft component perfused by hot gas to a housing or frame, which comprises the features stated in claim 1.

The device according to the invention is capable of eliminating the disadvantages that have been described. It reduces or prevents stresses as a consequence of thermal expansion, relative movements of the connecting components, deformations of the structure due to operation, and vibrations. In addition, deviations of position and geometry of the connecting components can be compensated with the device according to the invention.

Through the use of a bellows, an angular misalignment and an axial positional misalignment of the device fitted to the housing and of a source of hot gas can be effectively equalised. In an advantageous further development of the device according to the invention a sealing connection to a firewall can be established, with a simultaneous possibility of compensation of positional and angular misalignments. The combination with a hollow conical shielding element is furthermore similarly advantageous, since the bellows is protected by the heat emanating from the hot gas. In addition, in a further development of the device static radial positional deviations can be equalised already in the course of assembly by means of a variably attachable force-fitting connection of a collar fitted to the coupling member.

The device according to the invention exhibits a number of advantages in comparison with known devices from the state of the art. The device according to the invention prevents or reduces, on the one hand, strains in the housing, in the pipes perfused by hot gas, in a firewall and in other structural members arranged in the immediate vicinity, both in the course of assembly and in flying operation. Moreover, the device according to the invention compensates static and dynamic dimensional deviations between the components involved and, in the case of use for a waste-gas system, so thermal expansions between the waste-gas system, a firewall and the surrounding structure in accordance with EASA Certification Specification CS 25A1123. The device according to the invention additionally allows the tight routing of a waste-gas channel through a firewall, so that the waste-gas channel complies with ISO Standard 2685 under all operating conditions and in the case of fire.

By virtue of the mechanical decoupling, vibrations between a waste-gas system and a firewall are reduced or prevented. By virtue of a force-fitting connection of the coupling member between the flange and the brace plate by means of a screw connection, a constant quality of connection is made possible, with a very flexible radial adjustment option. Lastly, the device according to the invention exhibits a very small installation-space requirement and a low weight.

BRIEF DESCRIPTION OF THE DRAWINGS

The invention will be elucidated in more detail in the following on the basis of the Figures. In the Figures the same objects are labelled by identical reference symbols. Shown are.

DETAILED DESCRIPTION

For the purpose of better comprehension, in the following an exemplary embodiment of the device according to the invention will be described which is integrated in exemplary manner into a military transport aircraft of the AIRBUS A400M type. The device according to the invention is not restricted to the mechanical decoupling of APU waste-gas pipes but may also be used in other aircraft systems in which a hot gas is to be conducted away through a pipe.

Figure 1:
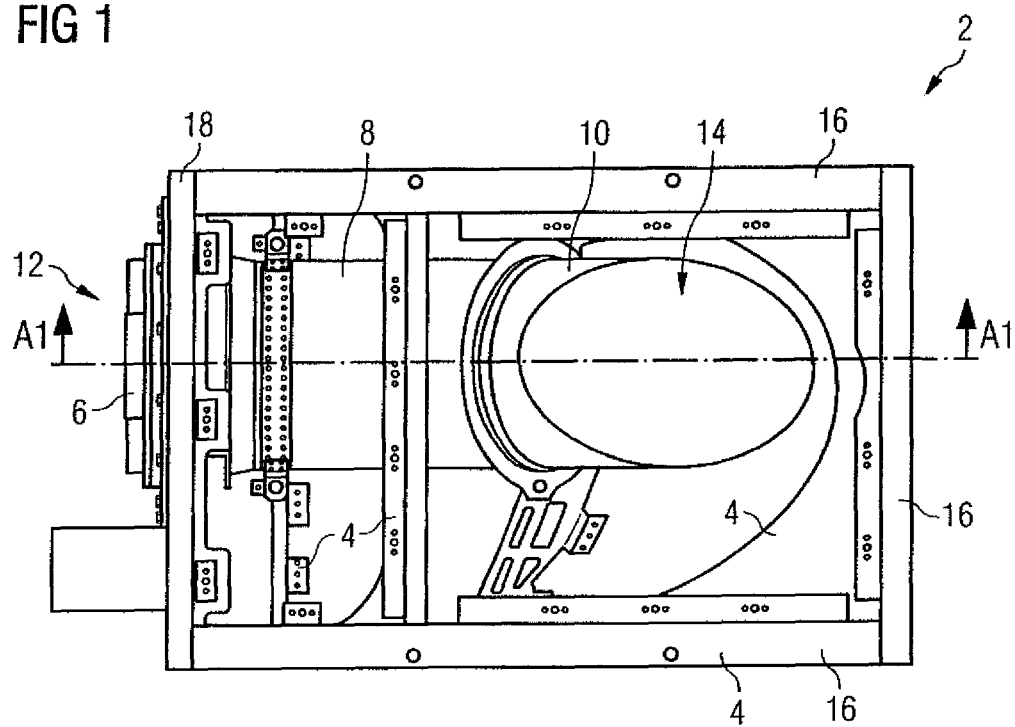
FIG. 1 top view of the device according to the invention.

FIG. 1 shows a waste-gas system 2 wherein a housing cover which is fitted during operation has been dismantled for the purpose of better representation. The waste-gas system 2 comprises a housing 4 formed from a sheet-metal tank, reinforcing members, holders and fittings, and a waste-gas channel consisting, in exemplary manner, of three consecutive waste-gas pipes 6, 8 and 10, which extends into the housing 4, starting from a waste-gas inlet 12. Waste-gas pipe 6 introduces the waste gas of an APU from the waste-gas inlet or interface 12 into the waste-gas system 2, where it enters waste-gas pipe 8 and from there is finally routed into the environment via waste-gas pipe 10 situated at a waste-gas outlet 14. The housing 4 is fastened to the mounting location via housing interfaces 16 and 18, via which the loads of the waste-gas system are conducted away. For example, in the case of the aircraft of type A400M, interface 16 represents the wing/fuselage fairing, and interface 18 represents the firewall.

Figure 2:
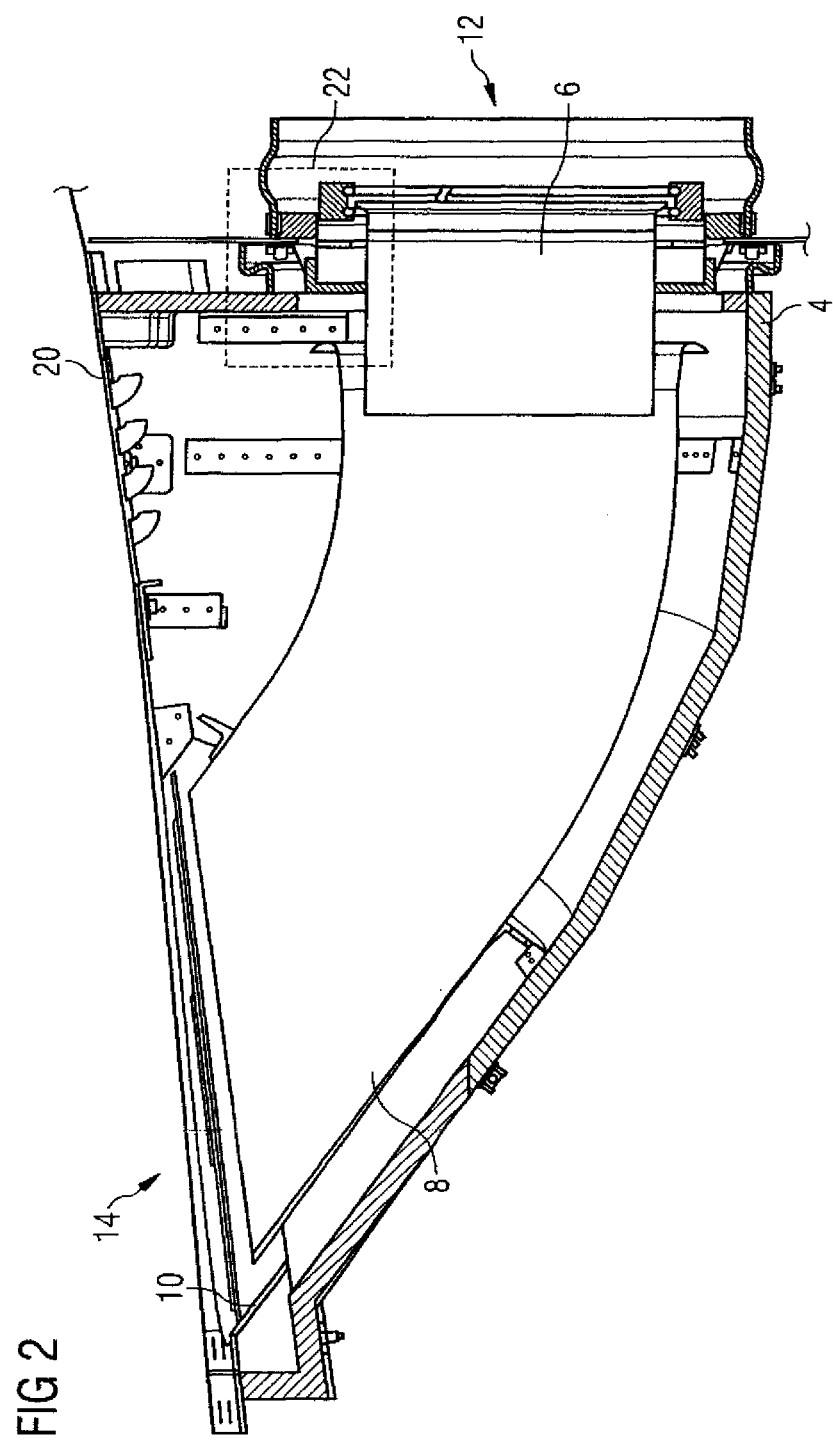
FIG. 2 lateral sectional view of a waste-gas system with the device according to the invention, and FIG. 3 lateral sectional view of the device according to the invention.

In FIG. 2 the waste-gas system 2 with the integrated device according to the invention is represented in section. The waste-gas channel which is established by the three waste-gas pipes 6, 8 and 10 is perfused with waste gas of an APU from the waste-gas inlet or interface 12. Waste-gas pipe 8 is fastened in the housing 4 by screws, waste-gas pipe 10 is welded in exemplary manner in a housing cover 20. Waste-gas pipe 6 is fastened in the housing 4 by the device 22 according to the invention for mechanical decoupling, in order to be able to compensate relative movements and thermal expansion effects and, equally under all operating conditions, to guarantee a tight connection of the waste-gas inlet or interface 12 of waste-gas pipe 6 to the APU.

Figure 3:
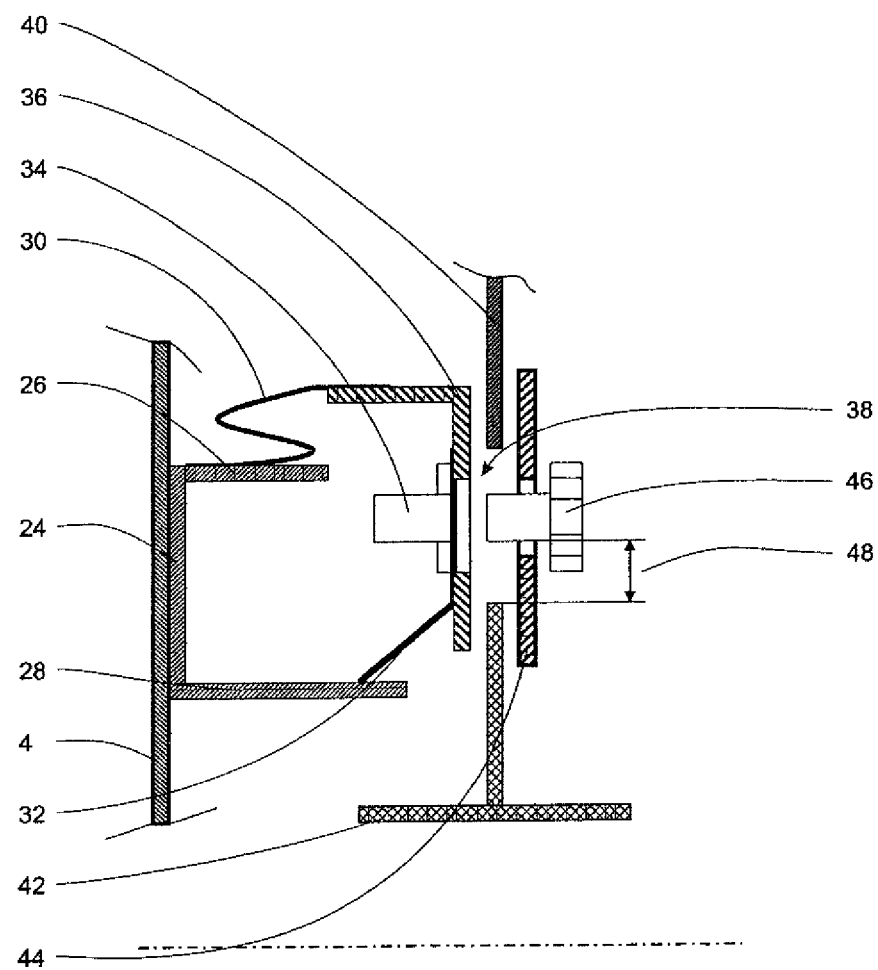

FIG. 3 shows the device 22 according to the invention in more detail on the basis of an enlarged portion identified in FIG. 2 by dashed lines. In this connection let it be noted that the structural members that have been presented are preferentially of rotationally symmetrical construction and are arranged centrically in relation to the dash-dotted line in FIG. 3, with one separately specified exception.

An annular holder 24, which is preferentially manufactured from sheet metal, is arranged on the housing 4 by means of a riveted joint, a welded joint or any other joining method. The holder 24 has a substantially U-shaped profile cross-section with an outer belt 26 and an inner belt 28. On the outer belt 26 of the holder 24 a bellows 30 is fastened, for example by a clip which is not represented in detail. A conical shielding element 32, which is likewise preferentially manufactured from sheet metal, is, together with several riveting nuts 34, arranged on the periphery, riveted or welded to a rotationally symmetrical flange 36 made of sheet metal with an angled profile cross-section.

The flange assembly 38 formed from the components constituted by flange 36, shielding element 32 and riveting nuts 34 connects the housing 4 and a firewall 40, which has been cut out in rotationally symmetrical manner, to one another and forms a part of the fastening of a coupling member 42 which is of cylindrical construction. In the course of assembly, the flange assembly 38 with the shielding element 32 is pushed over the inner belt 28 of the holder 24, and subsequently the bellows 30 is fastened to the flange assembly 38 by means of a clip, as a result of which the flange assembly 38 is similarly fastened to the housing 4 by the bellows 30.

The flange assembly 38 is axially guided by the shielding element 32 on the holder 24. As a result, the flange assembly 38 is axially mobile and can be inclined in any direction. The shielding element 32 serves to hold back the waste gas of the APU, in order to protect the bellows 30 from heat. The housing 4 is inserted into the lining of the wing/fuselage fairing and fastened at the interfaces 16 and 18, so that it is positioned in fixed manner, the flange assembly 38, however, firstly bears loosely against the outside of the firewall 40. In the region of the waste-gas system the firewall 40 consists of a refractory wall which is reinforced with riveted stringers. In the region of the bushing of the waste-gas inlet or interface 12 for attaching to the APU the firewall 40 is recessed in circular manner. From the inside of the firewall 40 the coupling member 42 is inserted and screwed together with the flange assembly 38, with a brace plate 44 and with the firewall 40 via the riveting nuts 34 by means of screws 46 which are radially distributed over the brace plate 44. The radial position of the coupling member 42 arises when the waste-gas inlet or interface 12 of the component conducting away waste gas is oriented centrically in relation to the interface of the system generating waste gas (e.g. APU).

By virtue of the arrangement that is shown, various technical properties can be realised. Firstly, axial static and dynamic dimensional deviations between the firewall 40 and the waste-gas system 2 are compensated by a displacement of the shielding element 32 on the lower belt 28 of the holder 24. Deviations in angularity between the housing 4 and the firewall 40 can be compensated by the flange assembly 38 being capable of being inclined arbitrarily in all directions. For instance, an obliquely-standing firewall 40 or an obliquely-situated waste-gas system 2 could be equalised by an appropriate inclination of the flange assembly 38.

Generally, static and dynamic dimensional deviations are compensated in this manner in such a way that strains between individual structural members and components do not occur and both the flange assembly 38 and the brace plate 44 always rest parallel to the respective sealing surfaces.

Static radial dimensional deviations at the waste-gas inlet or interface 12 between the waste-gas system 2 and the APU can easily be compensated by appropriate adjustment of the coupling member 42. In this connection the radially variably positionable coupling member 42 is pushed radially into a desired position (see reference symbol 48). As a result of screwing-in and tightening of the screws 46, the coupling member 42 is fixed and fastened in the appropriate position.

Dynamic radial dimensional deviations can be resiliently intercepted via the holder 24 and the shielding element 32. The dimensional deviations to be compensated can be enlarged by extending the inner belt 28 of the holder 24 and/or the shielding element 32. Moreover, additional slots in the shielding element 32 and/or in the lower belt 28 of the holder 24 likewise have a positive effect on the magnitude of the dimensional deviations to be radially compensated. In order to guarantee fire resistance of the connection between the holder 24 and the shielding element 32 in accordance with ISO 2685, such slots should be covered. In this connection, two slotted conical shielding elements 32 made of thin sheet metal will have to be laid on top of one another and will preferentially have to be connected by means of a spot-welding process. In this connection, care is to be taken to ensure that the slots of both shielding elements 32 are arranged in slightly offset manner, so that the slots are covered and guarantee tightness. With the same method it is possible for a slotted lower belt 28 of the holder 24 to be sealed.

The device according to the invention enables a particularly effective mechanically decoupled retention of components perfused by hot gas in an aircraft, in order to eliminate thermal stresses as far as possible and to equalise positional misalignments between the pipes and sources of hot gas. The technical design that is shown is to be understood merely as an exemplary embodiment, which is to be understood only for the purpose of clarifying the technical features according to the invention, and not as a restriction of the scope of protection.

The invention claimed is:

1. Device for mechanically decoupled fastening of an aircraft component perfused by hot gas to a housing or frame, which comprises:
   a coupling member which is connectable to the aircraft component perfused by hot gas,
   a holder which is connectable to the housing or frame, to which a first end of a bellows is fastened, and
   a flange, a second end of the bellows and the coupling member being fastened to the flange, so that the coupling member is connected to the holder via the flange and the bellows, and furthermore a shielding element for thermal shielding of the bellows from heat of the hot gas perfusing the aircraft component, the shielding element being fastened to the flange, wherein the flange bears in sealing manner against a firewall which comprises a passage opening.

2. Device according to claim 1,
   wherein the coupling member has a substantially cylindrical shape for connection to an aircraft component perfused by hot gas, in the form of a waste-gas pipe.

3. Device according to claim 2, wherein the holder is substantially of annular construction.

4. Device according to claim 2, wherein the shielding element for shielding the bellows from the high thermal load is of hollow conical construction and fastened coaxially to the flange.

5. Device according to claim 2, wherein the shielding element comprises slots.

6. Device according to claim 2, which exhibits two or more hollow conical shielding elements comprising mutually offset slots, which are arranged above one another and connected to one another.

7. Device according to claim 1,
   wherein the holder is substantially of annular construction.

8. Device according to claim 7, wherein the shielding element for shielding the bellows from the high thermal load is of hollow conical construction and fastened coaxially to the flange.

9. Device according to claim 7, wherein the shielding element comprises slots.

10. Device according to claim 1,
    wherein the shielding element for shielding the bellows from high thermal load is of hollow conical construction and fastened coaxially to the flange.

11. Device according to claim 1,
    wherein the shielding element comprises slots.

12. Device according to claim 1,
    which exhibits two or more hollow conical shielding elements comprising mutually offset slots, which are arranged above one another and connected to one another.

13. Device according to claim 1,
    wherein the coupling member comprises a collar-shaped extension on an outer periphery, so that the profile cross-section of the coupling member is substantially T-shaped.

14. Device according to claim 13,
    wherein the collar-shaped extension is fastened to the flange in a force-fitting manner.

15. Device according to claim 14,
    wherein the collar-shaped extension is clamped so as to be capable of being radially offset between the flange and a brace plate.

16. Device according to claim 15,
    wherein the brace plate is fastened to the flange by screws which are distributed radially over the brace plate and screwed into corresponding riveting nuts.

17. Device according to claim 1,
    wherein the firewall is substantially disc-shaped.

18. Device according to claim 17,
    wherein the firewall is arranged between the flange and the brace plate.

19. Device according to claim 1,
    wherein the shielding element is used for equalizing an angular misalignment and/or a radial or axial positional misalignment and wherein the shielding element rests resiliently in axially displaceable manner on a substantially axial belt of the holder.

20. Device according to claim 1, wherein the first end of the bellows is fitted to an upper belt of the holder.

* * * * *